May 7, 1940.   H. SAUER   2,199,715
FILTER FOR THE PHOTOGRAPHY AND PROJECTION OF COLORED PICTURES
Filed Jan. 27, 1938
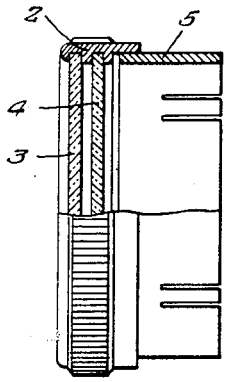
Fig. 1
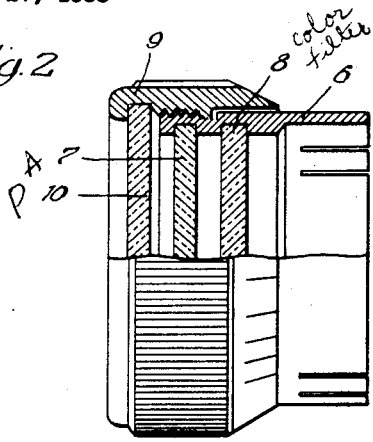
Fig. 2
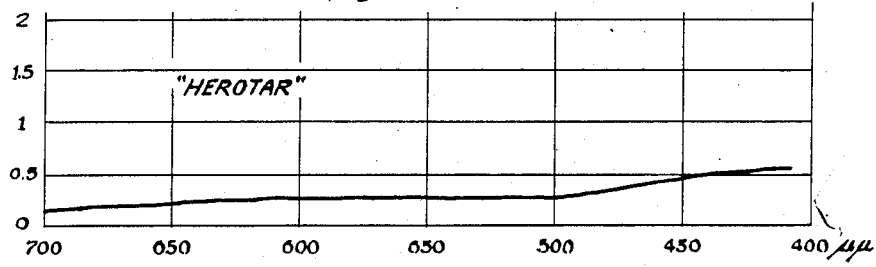
Fig. 3 "HEROTAR"
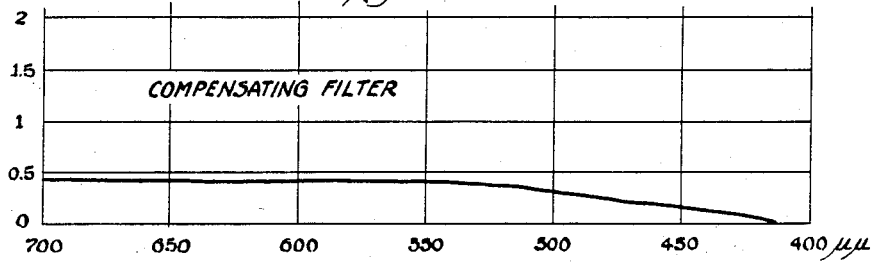
Fig. 4 COMPENSATING FILTER
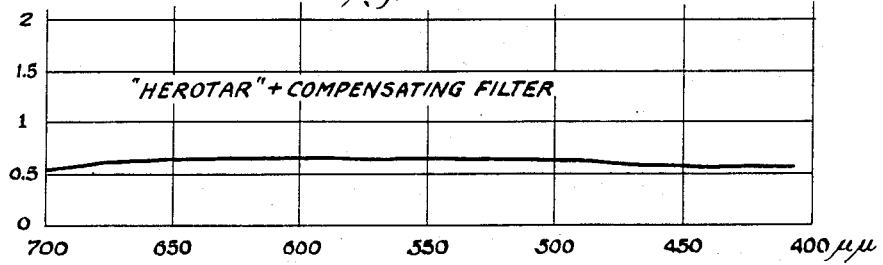
Fig. 5 "HEROTAR" + COMPENSATING FILTER
Inventor
Hans Sauer
by B. Singer
Atty.

Patented May 7, 1940

2,199,715

UNITED STATES PATENT OFFICE 2,199,715

FILTER FOR THE PHOTOGRAPHY AND PROJECTION OF COLORED PICTURES

Hans Sauer, Dresden, Germany, assignor to Zeiss Ikon Aktiengesellschaft, Dresden, Germany Application January 27, 1938, Serial No. 187,283
In Germany January 29, 1937

4 Claims. (Cl. 95—64)

The invention relates to improvements in filters for the photography and projection of colored pictures.

It is known to employ polarizing filters for eliminating disturbing reflections when taking photographic pictures. It also has been proposed heretofore, in the art of photographing on and projecting from lens screen film, to employ as a light diminishing device a polarizing means composed of two polarizing filters which are relatively rotatably adjustable with respect to each other.

These light diminishing or dimming devices have substantial advantages over the previously employed gray discs, gray wedges, etc., because it is possible to retain the same light diminishing device for different intensities of illumination, while gray discs have to be exchanged whenever the light intensity is altered.

When using polarizing filters for eliminating disturbing reflections, and also when using polarizing filters in a manner mentioned above, as a light diminishing device in photography or projection of colored pictures, it is necessary for the reproduction of the various colors uniformity should be maintained, as far as the weakening effect of the filters for all colors is concerned. The light passing through the polarizing filter or filters for elimination of reflections or for stopping down the lens should be diminished within the entire visible range of the spectrum, independent of the wave length. In other words, the polarizing filter or the polarizing filter combination must be combined with suitable color filters, so that the entire filter assembly produces a neutral gray dimming effect.

It is now the principal object of the present invention to combine a polarizing filter, or a combination of polarizing filters, heretofore employed for purposes set forth in the foregoing, with one or more color filters in such manner that the resulting dimming effect is independent of the wave length of the light.

Other objects of the invention will appear or will be pointed out in the following description of the invention with reference to the accompanying drawing illustrating by way of example two embodiments of the invention.

In the drawing:

Fig. 1 illustrates in elevation view and partly in axial section a filter assembly composed of one polarizing filter and one color filter;

Fig. 2 illustrates in elevation and partly in axial section a filter assembly composed of two polarizing filters and one color filter;

Fig. 3 illustrates diagrammatically the absorption curve of a polarizing filter;

Fig. 4 illustrates diagrammatically the absorption curve of a color filter, and

Fig. 5 illustrates diagrammatically the absorption curve of a filter assembly composed of the filters whose absorption curves are illustrated in Figs. 3 and 4.

Referring to Fig. 1, a mounting ring 2 has secured therein a polarizing filter 3 and a color filter 4 and is rotatably mounted on an adapter 5 in the form of short cylindrical tube. The tubular adapter 5 is adapted to be detachably mounted upon the lens mounting of a camera (not shown) so as to arrange the two filters 3 and 4 in axial alinement with the camera lens.

In the embodiment of Fig. 2, the tubular adapter 6, which as in Fig. 1 is provided for detachably attaching the filter assembly on a camera objective, has fixedly mounted in its outer end a polarizing filter 7 used as analyser and a color filter 8. Rotatably mounted on the outer end of the adapter 6 is an annular mounting 9 in which is fixedly secured a polarizing filter 10 used as polarizer.

It has been found by tests that polarizing filters produced by the Bernauer process and which are known as "Herotars" exhibit a greater absorption in the blue range of the spectrum than in the red range. The absorption curve of a Herotar filter is illustrated in Fig. 3. In this diagram the abscissae indicate the wave length in $\mu\mu$ and the ordinates the light absorbing effect (blackening). In order to make this filter neutral gray over the entire visible spectrum it should be combined with a compensating filter as for instance a filter whose absorption curve has the form as illustrated in Fig. 4. Such a compensating filter is produced from the dye stuffs Toluidin blue, Sirius violet and Ponceau red.

The two filters of Figs. 3 and 4 combined will then produce an absorption curve as illustrated in Fig. 5. This curve shows clearly that the combined filters will produce the desired neutral gray characteristic throughout the entire visible range of the spectrum.

The adapter 6 may also be used for mounting the filter assembly on the objective of a projector.

The invention is not limited to these two embodiments, but numerous modifications may be adopted within the scope of the present invention. It is for instance possible, to provide in Fig. 1 the polarizing filter 3, and in Fig. 2 one of the two polarizing filters 7 or 10 with color filtering properties. Furthermore, it is possible to combine the filter assembly of the invention directly as integral structure with the objective of a photographic camera or a projector. If desired, the color filters may be substituted by selective reflecting mirrors.

What I claim is:

1. The combination with a light polarizing filter which absorbs light rays of shorter wave length to a greater extent than light rays of longer wave length, of a color filter absorbing light rays of longer wave length to a greater extent than light rays of shorter wave length, the sum of the absorption factors of the two filters being substantially the same for all wave lengths, thus producing a substantial neutral gray dimming of the light passing through the same over the entire visible range of the spectrum.

2. The combination, in a single mount, of a light polarizing filter which absorbs light rays of shorter wave length to a greater extent than light rays of longer wave length, and a color filter absorbing light rays of longer wave length to a greater extent than light rays of shorter wave length, the sum of the absorption factors of the two filters being substantially the same for all wave lengths, thus producing a substantial neutral gray dimming of the light passing through the same over the entire visible range of the spectrum.

3. The combination with a light polarizing filter which absorbs light rays of different wave length to a different extent, of a color filter absorbing light rays of different wave length to a different extent, but inversely to the absorptive property of said polarizing filter and in such a proportion that the sum of the absorption factors of the two filters being substantially the same for all wave lengths, so as to produce a substantial neutral gray dimming of the light passing through the same over the entire visible range of the spectrum.

4. The combination, in a single mount, of a light polarizing device consisting of two axially alined and relatively rotatably adjustable polarizing filter discs, and a color filter in axial alinement with said filter discs, said polarizing device absorbing light rays of shorter wave length to a greater extent than light rays of longer wave length, and said color filter absorbing light rays of longer wave length to a greater extent than light rays of shorter wave length, the sum of the absorption factors of the polarizing device and the color filter being substantially the same for all wave lengths, thus producing a substantial neutral gray dimming of the light passing through the same over the entire visible range of the spectrum.

HANS SAUER.